United States Patent
Huang (10) Patent No.: US 10,674,853 B2
(45) Date of Patent: *Jun. 9, 2020

(54) COOKING DEVICE WITH MULTIPLE HEATING UNITS

(71) Applicant: ZEZHI INTELLECTUAL PROPERTY SERVICE, Shenzhen (CN)

(72) Inventor: Zhonghui Huang, Shenzhen (CN)

(73) Assignee: ZEZHI INTELLECTUAL PROPERTY SERVICE, Shenzhen (CN)

( * ) Notice: Subject to any disclaimer, the term of this patent is extended or adjusted under 35 U.S.C. 154(b) by 126 days.

This patent is subject to a terminal disclaimer.

(21) Appl. No.: 16/034,948

(22) Filed: Jul. 13, 2018

(65) Prior Publication Data

US 2018/0317691 A1    Nov. 8, 2018

Related U.S. Application Data

(63) Continuation-in-part of application No. 15/697,514, filed on Sep. 7, 2017, now Pat. No. 10,045,651, which
(Continued)

(51) Int. Cl.
*A47J 27/092* (2006.01)
*A23L 5/10* (2016.01)
(Continued)

(52) U.S. Cl.
CPC .............. *A47J 27/092* (2013.01); *A23L 5/17* (2016.08); *A47J 27/004* (2013.01); *A47J 27/086* (2013.01);
(Continued)

(58) Field of Classification Search
CPC ..... A23L 5/17; A47J 27/004; A47J 2027/043; A47J 36/321; A47J 36/38; A47J 37/128;
(Continued)

(56) References Cited

U.S. PATENT DOCUMENTS

2,372,978 A * 4/1945 Pelenberg ............... A47J 29/02
99/410
4,346,651 A * 8/1982 Schickedanz ......... A47J 37/085
219/411
(Continued)

*Primary Examiner* — Drew E Becker
(74) *Attorney, Agent, or Firm* — Hemisphere Law, PLLC; Zhigang Ma (57) ABSTRACT

A cooking device includes a base, a housing, partition walls, a lid, a control module, an exhaust module, a connecting electrode and a heating module. The exhaust module includes an air-filled element, an air-extraction element, an inlet passage and an exhaust passage. The air-extraction element is used to exhaust fog or oil fume generated in the plurality of inner pots. The connecting electrode is arranged in a middle position of the base. The heating module includes: bottom heating units disposed different locations inside a storage compartment of the housing respectively and connected with the processor individually; second heating units arranged on the partition walls and connected with the connecting electrode by wires inside the partition walls; and third heating units arranged on the inner wall of the housing.

8 Claims, 5 Drawing Sheets

Related U.S. Application Data is a continuation of application No. 15/054,945, filed on Feb. 26, 2016, now Pat. No. 9,795,250.

(51) Int. Cl.

| | | |
|---|---|---|
| *A47J 36/32* | (2006.01) | |
| *A47J 27/00* | (2006.01) | |
| *A47J 27/122* | (2006.01) | |
| *A47J 37/10* | (2006.01) | |
| *A47J 36/06* | (2006.01) | |
| *A47J 27/086* | (2006.01) | |
| *A47J 36/16* | (2006.01) | |
| *A47J 27/04* | (2006.01) | |
| *A47J 37/12* | (2006.01) | |
| *A47J 36/38* | (2006.01) | |

(52) U.S. Cl.
CPC ............. *A47J 27/122* (2013.01); *A47J 36/06* (2013.01); *A47J 36/16* (2013.01); *A47J 36/32* (2013.01); *A47J 36/321* (2018.08); *A47J 37/101* (2013.01); *A47J 37/105* (2013.01); *A47J 37/108* (2013.01); *A47J 36/38* (2013.01); *A47J 37/128* (2013.01); *A47J 2027/043* (2013.01)

(58) Field of Classification Search
CPC ......... A47J 27/08–27/092; A47J 27/12–27/13; A47J 36/06–36/12; A47J 36/16–36/22; A47J 37/10–37/108; A47J 36/32
USPC ............ 426/231–233, 523; 99/448, 325–338
See application file for complete search history.

(56) References Cited

U.S. PATENT DOCUMENTS

| | | | | |
|---|---|---|---|---|
| 4,646,628 | A * | 3/1987 | Lederman | A47J 27/122 |
| | | | | 220/23.4 |
| 4,817,512 | A * | 4/1989 | Vangen | A47J 27/004 |
| | | | | 219/417 |
| 5,402,714 | A * | 4/1995 | Deneault | A47J 36/20 |
| | | | | 126/369 |
| 5,535,664 | A * | 7/1996 | Rokowski | A47J 36/32 |
| | | | | 219/487 |
| D395,787 | S * | 7/1998 | Wilks | D7/357 |
| 5,865,098 | A * | 2/1999 | Anelli | A47J 27/004 |
| | | | | 126/246 |
| 6,035,766 | A * | 3/2000 | Schirmer | A47J 27/12 |
| | | | | 126/369 |
| 6,188,046 | B1 * | 2/2001 | Barrow | A47J 27/12 |
| | | | | 219/432 |
| 6,222,160 | B1 * | 4/2001 | Remke | A45C 11/20 |
| | | | | 219/387 |
| 7,166,822 | B1 * | 1/2007 | Chang | A47J 27/022 |
| | | | | 219/430 |
| 8,067,715 | B2 * | 11/2011 | Peterson | F24C 7/105 |
| | | | | 206/373 |
| 9,795,250 | B2 * | 10/2017 | Huang | A23L 5/17 |
| 10,045,651 | B2 * | 8/2018 | Huang | A47J 27/004 |
| 2002/0038802 | A1 * | 4/2002 | Tersch | A47J 27/12 |
| | | | | 220/573.4 |
| 2011/0017078 | A1 * | 1/2011 | O'Connell | A47J 27/05 |
| | | | | 99/448 |
| 2013/0011537 | A1 * | 1/2013 | Vahid | A47J 27/13 |
| | | | | 426/523 |
| 2017/0071403 | A1 * | 3/2017 | Thumthajira | A47J 36/32 |
| 2018/0192820 | A1 * | 7/2018 | Chang | A47J 37/049 |
| 2018/0317692 | A1 * | 11/2018 | Huang | A23L 5/17 |
| 2018/0317693 | A1 * | 11/2018 | Huang | A23L 5/17 |
| 2018/0352992 | A1 * | 12/2018 | Zhang | A47J 27/004 |

* cited by examiner

COOKING DEVICE WITH MULTIPLE HEATING UNITS

CROSS-REFERENCE TO RELATED APPLICATIONS

This application is a continuation-in-part of U.S. patent application Ser. No. 15/697,514, filed on Sep. 7, 2017, now U.S. Pat. No. 10,045,651 B2, which is a continuation application of U.S. patent application Ser. No. 15/054,945, filed on Feb. 26, 2016, now U.S. Pat. No. 9,795,250, the disclosures of which are incorporated herein by references in their entirety.

TECHNICAL FIELD

The present invention relates to a household electric appliance, and particularly to a cooking device with a compact structure that can prevent oil fumes.

DESCRIPTION OF RELATED ART

Cooking food is one of the essential activities in people's lives. With the development of technology, the type and style of each of the cooking methods and the cooking devices has become increasingly diverse. However, each of the cooking devices unveiled on the market generally is one single pot, and the single pot has integrated functions of sautéing food, steaming food, barbecuing food, etc. Since the single pot has multiple functions, the practical quality of every function is not high, i.e., comprehensive but not specialized.

Therefore, some multi-purpose pot, which can cook a variety of foods simultaneously, has been proposed in the prior art. For example, there are some cooking devices invented by He Ting Hua, such as a dual intelligent rice cooker disclosed in patent (Chinese patent application publication No. 99240621.8). There are also some cooking devices invented by Shi Jun Da, such as a triple slow cooker disclosed in patent (Chinese patent application publication No. 201010564027.5), a triple slow cooker disclosed in patent (Chinese patent application publication No. 201010223628.X), a slow cooker with a control panel of computer disclosed in patent (Chinese patent application publication No. 201310313040.7), a slow cooker disclosed in patent (Chinese patent application publication No. 200810061573.X), a slow cooker with an embedded heating structure disclosed in patent (Chinese patent application publication No. 201110087910.4), a triple warmer cooker disclosed in patent (Chinese patent application publication No. 201110066811.8), a triple slow cooker disclosed in patent (Chinese patent application publication No. 200910153461.1), a detachable slow cooker disclosed in patent (Chinese patent application publication No. 201310168675.2), a triple divided warmer cooker disclosed in patent (Chinese patent application publication No. 201110030368.9), and a triple cooker disclosed in patent (Chinese patent application publication No. 201310168728.0), which can simmer three different kinds of food once. For example, there are still some cooking devices invented by Chen Ping Tao, Wu Jin Shui and Yang Guo Qing, such as an electric cooker disclosed in patent (Chinese patent application publication No. 201320276658.6), an electric cooker disclosed in patent (Chinese patent application publication No. 201320179101.0) and an electric cooker disclosed in patent (Chinese patent application publication No. 201220553296.6), which can simmer two or more than two kinds of food once.

However, the structures of the multiple-functional pots in the related art described above, which are similar to that of the conventional stove, are still relatively complicated but not compact.

In addition, as to the fog in the rice cooker, a vacuum insulation device is disclosed by Li Wen Qing in patent (Chinese patent application publication number No. 200510037553.5), which can vacuumize the inner pot thereof and thus delay in getting the preserved rice yellow and sour. However, such a design of electric cooker doesn't help in oil fumes generated during cooking. A cooking device is disclosed by QianHaiPeng etc., in patent (Chinese patent application publication number No. 200910204171.5), which includes a casing, an upper lid hinged with the upper end of the casing, an insulation inner cylinder that is fixed inside the casing, a cooking pot arranged in the insulation inner cylinder and a control device used to control the running of the cooking device; further includes a lower heating device, which is located at the lower part of the cooking pot and fixed on the inner bottom surface of the insulation inner cylinder; an inlet nozzle of an exhaust device is connected with a chamber formed by the casing and the upper lid, and an outlet of the exhaust device is connected with outside to exhaust the waste gas in the chamber; and a temperature control device is arranged on the bottom surface of the insulation inner cylinder to detect the temperature of the cooking pot and transmit the temperature information to the control device so that the switch of the lower heating device can be controlled. The lower heating device, the exhaust device and the temperature control device are electrically connected with the control device respectively. The lower heating device can heat the food put in the cooking pot, and the exhaust device can exhaust the oil fume and steam in the chamber of the cooking device, which can improve the quality of cooked food. Furthermore, the cooking device disclosed in patent (Chinese patent application publication number No. 200910204171.5) further includes an air-blow device, the exhaust port of the air-blow device is connected with the chamber formed by the casing and the upper lid, and the air inlet of the air-blow device is connected with outside to supply air into the chamber. However, in the cooking device disclosed in patent (Chinese patent application publication number No. 200910204171.5), the inlet nozzles connected with outside are arranged at the bottom of the cooking device, the air in the cooking device will enter the inner pot after being heated, and in this way, it is not easy to replace the steam or the oil fume inside with the air outside, it is likely that more steam or oil fume leaks out when opening the lid, thereby causing air pollution.

SUMMARY

Concerning the above situations, it is necessary to provide a cooking device with a compact structure that can prevent oil fume.

A cooking device includes a base, a housing, partition walls, a lid, a control module, an exhaust module, a connecting electrode and a heating module. The housing is disposed on the base and provided with a storage compartment. The partition walls are detachably fixed through the base and an inner wall of the housing to divide the storage compartment into a plurality of sub-storage compartments. The plurality of sub-storage compartments are configured (i.e., structured and arranged) to accommodate a plurality of inner pots therein respectively. The lid is disposed on the housing and matched with an opening of the storage compartment. The control module includes a processor and an input panel connected with the processor. The exhaust module includes an air-filled element, an air-extraction element, an inlet passage and an exhaust passage. The inlet passage is disposed on the lid, and the air-filled element is disposed on the inlet passage. The air-extraction element is disposed on the exhaust passage and used to exhaust fog or oil fume generated in the plurality of inner pots. The connecting electrode is arranged in a middle position of the base. The heating module includes bottom heating units, second heating units and third heating units. The bottom heating units are disposed different locations inside the storage compartment respectively and connected with the processor individually and further controlled independent from each other. The second heating units are arranged on the partition walls and connected with the connecting electrode by wires inside the partition walls. The third heating units are arranged on the inner wall of the housing.

DETAILED DESCRIPTION OF EMBODIMENTS

The cooking device of the present invention is further described in detail with reference to the accompanying drawings and embodiments.

Referring to FIG. 1 through FIG. 4, a cooking device 10 of a first exemplary embodiment of the present invention includes a housing 11, a base 12, inner pots 13, a lid 14, a heating module 15, a control module 16 and an exhaust module 18. The housing 11 is arranged on the base 12. The housing 11 has a storage compartment 112. The inner pots 13 are put in the storage compartment 112. The control module 16 includes a processor 162 and an input panel 164 connected with the processor 162. The heating module 15 is arranged inside the storage compartment 112, and includes multiple bottom heating units 152, 154 and 156, which are independent from each other. The bottom heating units 152, 154 and 156 are respectively connected with the processor 162. There are a plurality of inner pots 13 arranged inside the storage compartment 112 and corresponding to the predetermined bottom heating units 152, 154 and 156. The lid 14 is arranged to cover the housing 11 and match with the opening of the storage compartment 112. The lid 14 has an inner surface 142, an external surface 144 opposite to the inner surface 142, and several transparent windows 146. The exhaust module 18 includes an air-filled element 181, an inlet passage 182, an air-extraction element 184 and an exhaust passage 186. The inlet passage 182 is defined on the lid 14. The air-filled element 181 is on the inlet passage 182, and the air-filled element 181 is for example connected with the processor 162 and provided with a high pressure gas storage chamber 1812 that is used to fast jet air to the inner pots 13. The air-extraction element 184 is connected with the processor 162. The air-extraction element 184 is on the exhaust passage 186, and the air-extraction element 184 is provided with a vacuum chamber 1842 that is used to fast exhaust air. The fog and oil fume in the inner pots 13 can be observed through the transparent windows 146. The air-extraction element 184 is used to exhaust the fog or oil fume in the inner pots 13 before opening the lid 14, and still can operate after opening the lid 14.

In the present exemplary embodiment, the storage compartment 112 of the housing 11 is divided into multiple sub-storage compartments, whose number is identical to the number of the bottom heating units 152, 154 and 156, i.e., there are three sub-storage compartments in the housing 11, and each sub-storage compartment has a bottom heating unit. The number of the sub-storage compartments can be set according to the requirements when designed in practical. The sub-storage compartments can correspond to the inner pots 13 with different sizes to meet more needs. It can be understood that each sub-storage compartment can correspond to multiple bottom heating units, and in this way, more heating control methods can be designed to heat the inner pots 13.

Figure 5:
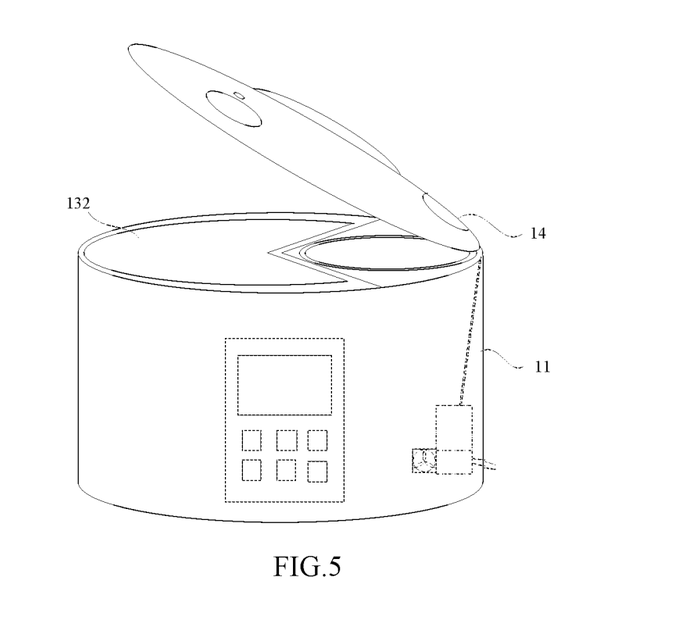
FIG. 5 is a schematic view illustrating one operative condition of the cooking device shown in FIG. 1.
Figure 6:
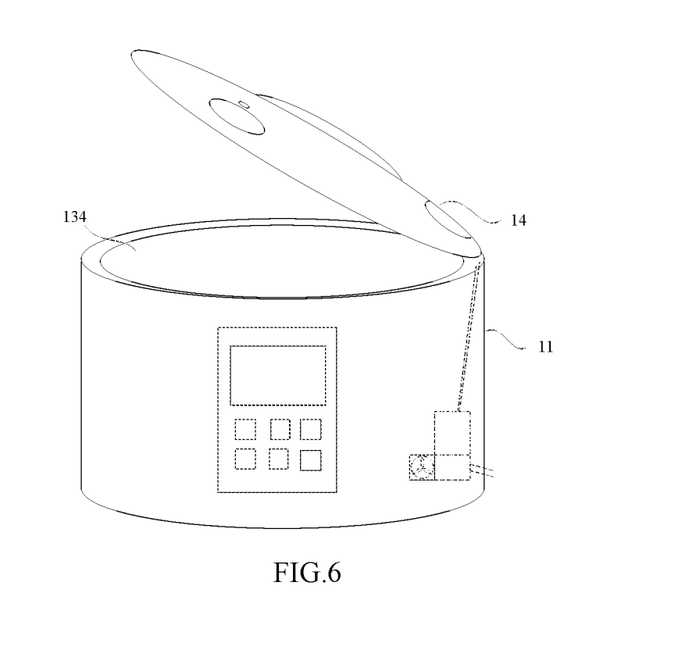
FIG. 6 is a schematic view illustrating another operative condition of the cooking device shown in FIG. 1.

The storage compartment 112 can be divided into multiple sub-storage compartments with detachable partition walls 114. The partition walls 114 can be fixed through the base 12 and the inner wall of the housing 11. Specifically, a corresponding side fixed groove (not shown) may be arranged on the inner wall of the housing 11 and a bottom fixed groove (not shown) may be arranged on the upper surface of the base 12 to fix the partition walls 114 together. Please refer to FIG. 5 and FIG. 6, when using the cooking device 10, inner pots with various sizes can be put inside by installing or removing the partition walls 114 to meet more using needs. For example, in FIG. 5, the volume of the sub-storage compartment doubles by removing one partition wall 114, and at his time an inner pot 132 can be put in the sub-storage compartment to cook more foods. In FIG. 6, the sub-storage compartment becomes the biggest storage compartment 112 by removing all the partition walls 114, and at this time an inner pot 134 can be put therein. It can be concluded from FIG. 1, FIG. 5 and FIG. 6 that the cooking device 10 can be installed with one or more detachable partition walls 114 to realize different cooking functions thereof. For example, when containing three sub-storage compartments in FIG. 1, the cooking device 10 can cook three kinds of food simultaneously. At his time, the number of the cooking dishes is maximum, which can meet different nutritional and taste needs of the user. In FIG. 5, the storage compartment 112 includes a big sub-storage compartment and a small sub-storage compartment. At this time, the cooking device 10 can cook two kinds of food simultaneously, for example, the big one is used to stew, and the small one is used to boil vegetables. In FIG. 6, the biggest inner pot 134 can be put in the cooking device 10, for example, it may be used to stew or cook porridge.

Figure 1:
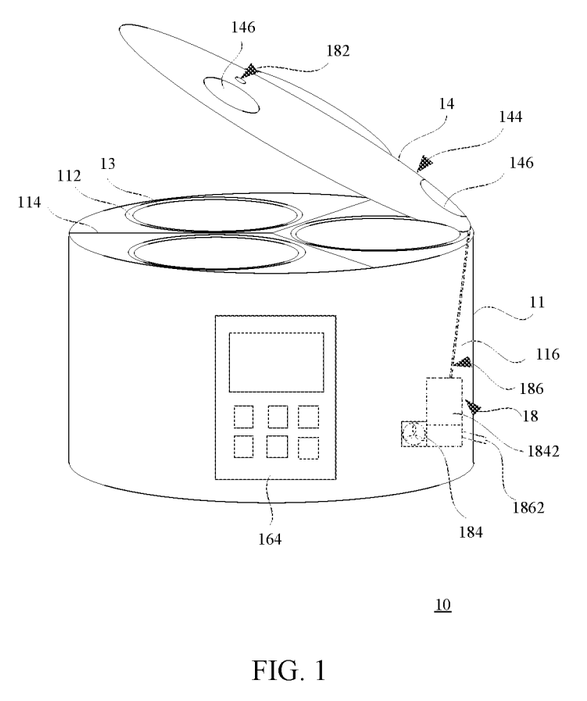
FIG. 1 is a schematic perspective view illustrating a cooking device of a first exemplary embodiment according to the present invention.
Figure 3:
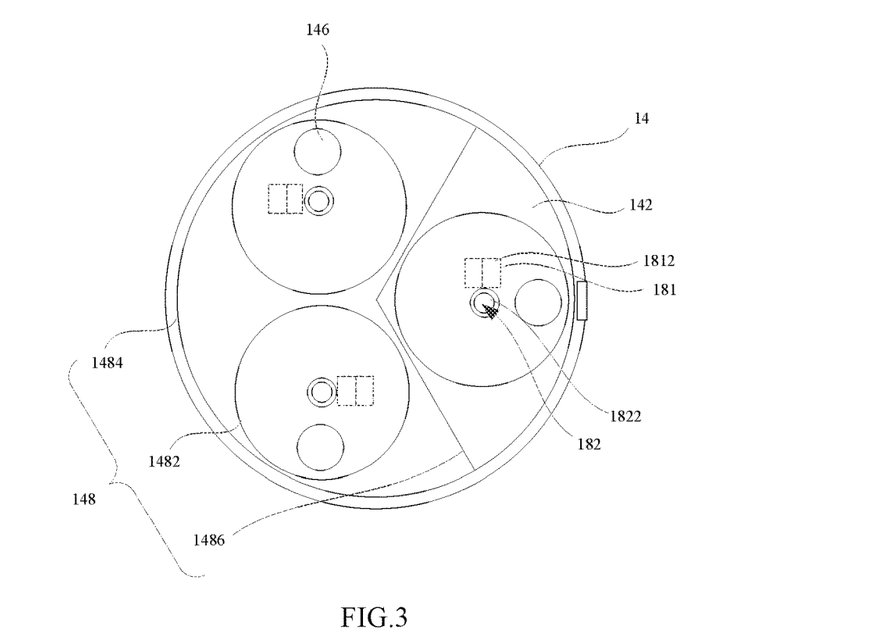
FIG. 3 is a bottom view illustrating the lid of the cooking device shown in FIG. 1.

Please refer to FIG. 1 and FIG. 3, the lid 14 includes the inner surface 142 and the external surface 144 opposite to the inner surface 142. In the present exemplary embodiment, sealing units 148 are arranged corresponding to openings of the sub-storage compartments and on the inner surface 142 of the lid 14. There are three groups of sealing units, a first group of sealing unit 1482 is arranged corresponding to the smallest inner pots 13 or the openings of the smallest sub-storage compartments, a second group of sealing unit 1486 is arranged corresponding to the medium inner pot 132 or the opening of the medium sub-storage compartment, and a third group of sealing unit 1484 is arranged corresponding to the largest inner pot 134 or the opening of the largest sub-storage compartment. The sealing units 148 can be used to seal an inner pot put into the corresponding storage compartment or sub-storage compartment. It's better to set a positioning structure between each sealing unit 148 and a corresponding sub-storage compartment to get a better sealing effect when each sealing unit 148 seals the corresponding inner pot 13. If the sealing units 148 are designed according to cooking requirements, when the cooking device 10 is designed to cook under normal pressure merely, the sealing units 148 are mainly used to prevent the part heat dissipation problem at the time of cooking and prevent the cooking dishes in different inner pots 13 from being mutual influenced. In this case, it is required that the outer peripheral size of each of the sealing units 148 may be larger than the size of the opening of each of the inner pots 13, that is, the sealing units 148 can cover the openings of the inner pots 13 in such a manner, the sealing units 148 are used to reduce heat dissipation and reduce the mutual influence between the inner pots 13 at the time of cooking on the premise that the structural complexity of the sealing units 148 is not increased.

Figure 2:
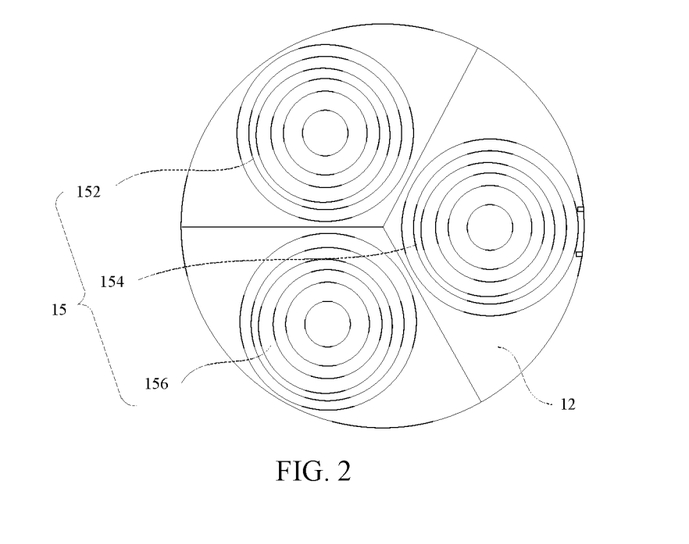
FIG. 2 is a top view illustrating the cooking device shown in FIG. 1 after removing a lid and inner pots thereof.

From another view, as seen from FIG. 1 through FIG. 3, the inner surface 142 of the lid 14 is provided with multiple e.g., three first sealing units 1482, one second sealing unit 1486 and one third sealing unit 1484. The third sealing unit 1484 is arranged corresponding to the opening of the storage compartment 112. The second sealing unit 1486 is connected with the third sealing unit 1484 to divide a region surrounded by the third sealing unit 1484 into multiple e.g., two sub-regions with different sizes (e.g., the left sub-region is larger than the right sub-region as shown in FIG. 3). The first sealing units 1482 are arranged corresponding to the three bottom heating units 152, 154, 156 respectively and located in the two sub-regions with different amounts, e.g., as shown in FIG. 3, the left sub-region has two first sealing units 1482 and the right sub-region has one first sealing unit 1482. Moreover, the lid 14 is provided with multiple .e.g., three transparent windows 146, and the three transparent windows 146 are respectively arranged in regions surrounded by the three first sealing units 1482 respectively. In addition, the amount of the inlet passage 182 is multiple, e.g., three, and the three inlet passages 182 are respectively arranged in regions surrounded by the respective first sealing units 1482.

Figure 4:
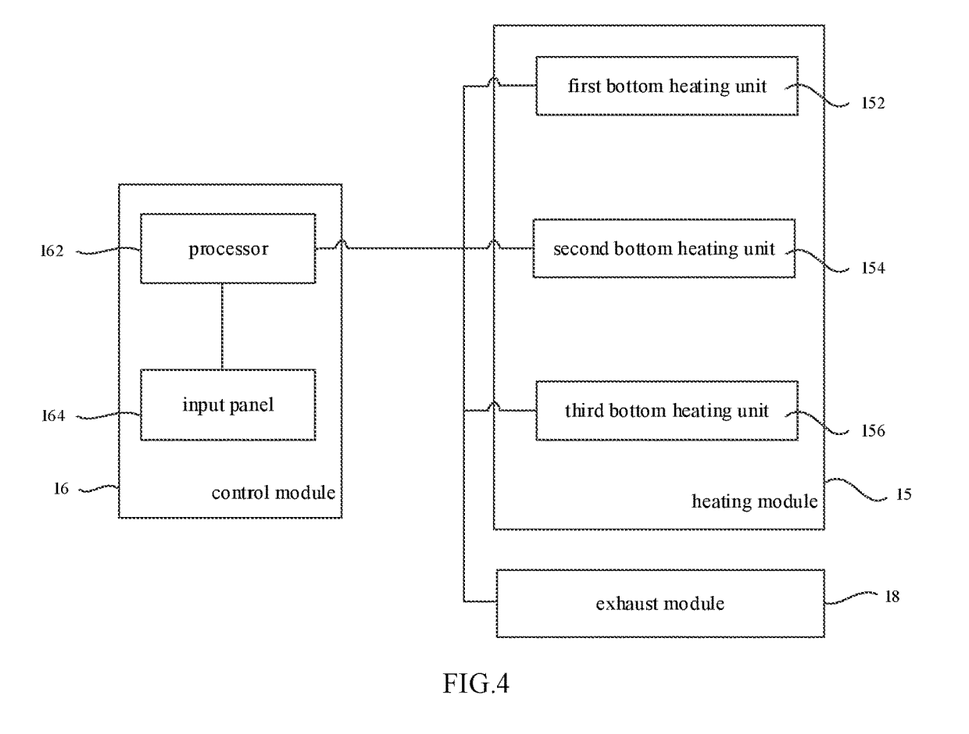
FIG. 4 is a structural view illustrating a connection of a control module of the cooking device shown in FIG. 1.

Please refer to FIG. 1 and FIG. 4, the processor 162 of the control module 16 may be arranged in the housing 11 or the base 12, and the input panel 164 may be arranged on the surface 116 of the housing 11. The input panel 164 may include a touch panel or a voice control unit, and a display panel may also be arranged on the touch panel 164, which is mainly used as an interface for inputting commands manually. The user may input desired control commands through the input panel 164, then the processor 162 respectively controls the bottom heating units 152, 154 and 156 according to the control commands, and in this way, same or different heating processing can be performed in the inner pots 13 that are put on the corresponding bottom heating units 152, 154 and 156. As a result, the user can cook a variety of dishes in one cooking device 10, which can improve the efficiency of cooking for convenience.

In the present exemplary embodiment, the transparent windows 146 are arranged corresponding to the openings of the sub-storage compartments in the lid 14. When different inner pots 13 are put into the storage compartment 112, each inner pot 13 can correspond to at least one transparent window 146, which is convenient for the user to see the cooking condition in the inner pots 13. One inlet passage 182 is provided with an inlet nozzle 1822, and the inlet nozzle 1822 is arranged on the inner surface 142. The number of the inlet nozzles 1822 is corresponding to the number of the bottom heating units, i.e., at least one inlet nozzle 1822 corresponds to each inner pot 13 above the inner pots 13. The inlet nozzle 1822 may be a rotatable nozzle, which can change the direction thereof using the impact of airflow in the air-filled element, and jet air to different positions in the inner pots. The air-filled element 181 is set on the inlet passage 182, and is provided with a high pressure gas storage chamber 1812 that can fast jet gas into the inner pot 13. The high pressure gas storage chamber 1812 can store high pressure gas, and the high pressure gas may be from outside air, or high pressure steam, preferably outside air. If the outside air is stored, the high pressure gas storage chamber 1812 can release the stored gas quickly to enable the outside air to contact with the dishes in the inner pot 13 when the dish in the inner pot 13 needs to be quenched or quick-fried. The air-extraction element 184 can be set in the housing 11 or the lid 14, and it is set in the housing 11 in the present exemplary embodiment. The exhaust passage 186 may be arranged in the housing 11 or the lid 14, and it is arranged in the housing 11 in the present exemplary embodiment. In the present exemplary embodiment, the exhaust passage 186 has an exhaust opening 1862, which is arranged on the side wall of the housing 11. A vacuum chamber 1842 of the air-extraction element 184 can fast exhaust steam or other oil fumes if needed. With this function of the vacuum chamber 1842, the air-extraction element 184 can fast exhaust the steam or other oil fumes in the inner pots 13 first without waiting for the fan working due to there is a pressure difference. If the fan starts to run at this time, it can also have an effect on exhaustion. Thus, the waiting time of user for opening the lid can be reduced, which improves convenience. In general, when cooking food, the outside air enters the inner pots 13, and the fog, the steam or other oil fumes in the inner pots 13 enters the exhaust passage 186 and then exhausts from the exhaust opening 1862 through the working of the air-extraction element 184. Since the cooking device 10 is provided with the exhaust module 18, when the cooking device 10 cooks food, the steam generated during heating food can be exhausted in time according to the needs of cooked food to prevent over-cooked of food. In addition, the outside air is also introduced while the inside steam is exhausted, and this outside air can make the cooked dishes more nutritional, healthier or more beautiful when cooking some dishes requiring oxidation or fresh air. More particularly, when it is required to open the lid 14, the user can observe through the transparent window 146 first, and then determine whether it needs to exhaust the fog or other oil fumes generated during heating food. After that, there is no steam/gas blowing out from the inside of the cooking device 10 when the user opens the lid 14, which is convenient for the user to use the cooking device 10 and protects the user's health. Furthermore, the exhaust module 18 can exhaust the steam generated during cooking food directly to sewer or outdoor, and then the oil fume in the kitchen can be reduced, which can improve the cooking environment and prevent influence of oil fumes on human health and pollution in the kitchen. In addition, the air-extraction element 184 may be arranged in such a manner that it still works after all the fog or oil fumes in the inner pots are exhausted before the user opens the lid 14 until the atmospheric pressure in the inner pots 13 is larger than or equal to the atmospheric pressure of the outside environment. At his time, it is easy to open the lid 14.

As stated above, the cooking device 10 includes multiple bottom heating units 152, 154 and 156 that can be controlled independently, different inner pots can be put in the sub-storage compartments corresponding to the bottom heating units 152, 154 and 156, and several predetermined sealing structures can be designed corresponding to the sub-storage compartments on the lid 14, which guarantees that the cooking device 10 can cook a variety of food or dishes at the same time and prevent the mutual influence among the different kinds of food or dishes (for example, a smell pollution among different dishes). Particularly, the cooking device 10 adopts an integrated structure, which is different from the structure connecting multiple independent cooking apparatus in series or heating different liners with a single heater simultaneously in the conventional technologies, not only can heat different inner pots using the bottom heating units 152, 154 and 156 respectively but also can obtain a more compact structure. Consequently, this cooking device 10 is easier to meet different cooking needs in people's living and reduce energy consumption. Furthermore, the exhaust module 18 can exhaust the fog or other oil fumes generated during cooking food, which can prevent the influence of oil fumes on human's health and pollution from kitchen.

Figure 7:
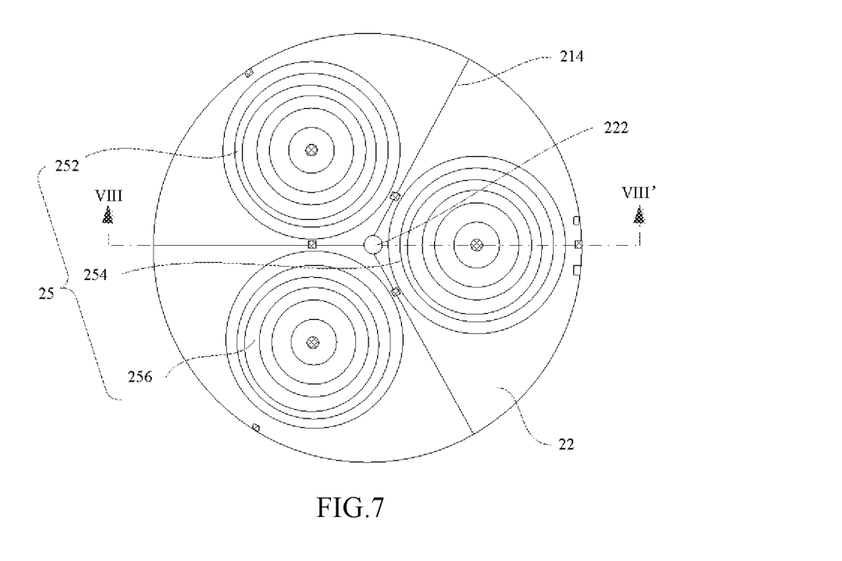
FIG. 7 is a schematic view illustrating a cooking device of a second exemplary embodiment according to the present invention after removing a lid and an inner pot thereof.
Figure 8:
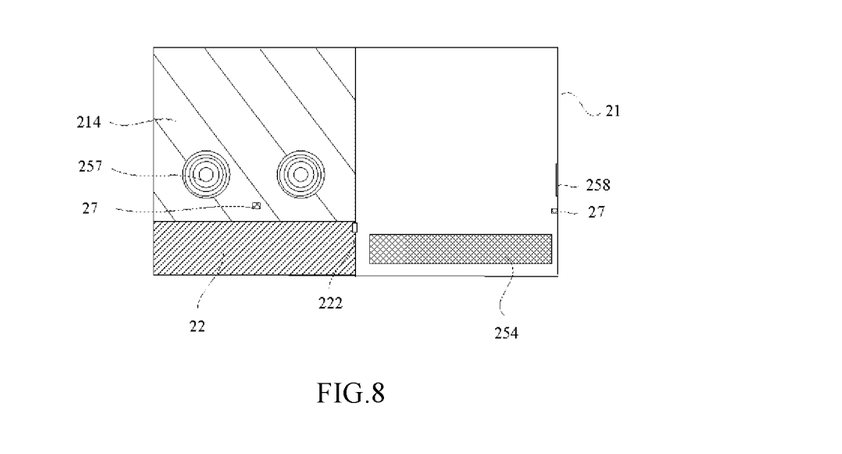
FIG. 8 is a schematic view obtained by dividing the cooking device shown in FIG. 7 along the VIII-VIII' line.

FIG. 7 and FIG. 8 illustrate the cooking device according to a second exemplary embodiment in the present invention. The cooking device in the second exemplary embodiment, similar to the cooking device 10, includes a heating module 25, which is arranged in the storage compartment and contains multiple bottom heating units 252, 254 and 256 independent from each other. Particularly, in the present exemplary embodiment, the heating module 25 further includes second heating units 257 and third heating units 258, a connecting electrode 222 is arranged in the middle of a base 22, and temperature detection sensors 27 are arranged on partition walls 214. The second heating units 257 and the third heating units 258 are respectively connected with a processor of a control module. The second heating units 257 are arranged at lower positions on the partition walls 214. The second heating units 257 are electrically connected with the connecting electrode 222 by arranging wires inside the partition walls 214 when the partition walls 214 are fixed. The third heating units 258 are arranged on the inner wall of a housing 21, and there are at least three third heating units 258 corresponding to the sub-storage compartments in the present exemplary embodiment. The temperature detection sensors 27 are arranged on the partition walls 214 and the inner wall of the housing 21, connected with the processor of the control module, used to detect temperature information in the inner pots during a cooking process and transmit the temperature information to the processor. In the present embodiment, the second heating units 257 and the third heating units 258 are respectively arranged on the partition walls 214 and the inner wall of the housing 21, thus the second heating units 257 and the third heating units 258 can heat the inner pots from the lateral surface of the inner pots during cooking process, which can help to improve the heating uniformity. Particularly, the second heating units 257 are arranged on the respective partition walls 214, thereby obtaining more accurate temperature control for respective sub-storage compartments. The temperature sensors 27 are arranged at positions in the middle between the bottom heating units and the second heating units 257, and also arranged at positions in the middle between the bottom heating units and the third heating units 258. By arranging the temperature sensors 27 on the partition walls 214 and the inner wall of the housing 21, the temperature sensors 27 can detect the temperature of the lateral wall of the inner pot when cooking food, which can monitor the temperature of the whole inner pot, making the temperature control at the time of cooking become more accurate, and thus prevent a case in which the food is undercooked or overripe.

Figure 9:
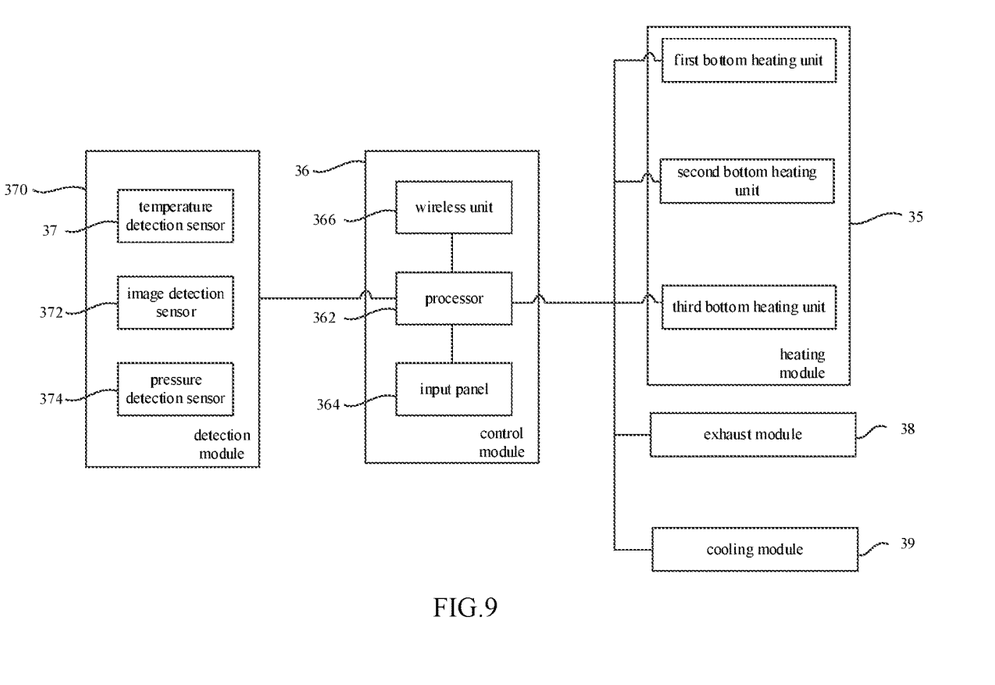
FIG. 9 is a structural view illustrating connections of a control module of a cooking device of a third exemplary of the present invention.

Please refer to FIG. 9. FIG. 9 illustrates a cooking device according to a third exemplary embodiment of the present invention. The cooking device according to the third exemplary embodiment, which is similar to the cooking device 10, includes a heating module 35, a control module 36, a detection module 370, an exhaust module 38 and a cooling module 39. The heating module 35 includes multiple bottom heating units. The control module 36 includes a processor 362, an input panel 364 and a wireless unit 366. The processor 362 is respectively connected with the input panel 364 and the wireless unit 366. The input panel 364 and the wireless unit 366 can be used as information input devices to input control commands to the cooking device. For example, the input panel 364 may be provided with a touch control unit or a voice control unit, and the cooking commands can be input through a touch control method or a voice control method. The wireless unit 366 can perform information interaction with a portable electronic device (e.g., a mobile phone, a laptop or a tablet PC etc.), thus can input control commands from external devices to the cooking device through a portable electronic device, or can transmit cooking parameters formed in the cooking device to the portable electronic device. The detection module 370 is connected with the processor 362 of the control module 36. The detection module 370 may include a temperature detection sensor 37, an image detection sensor 372 and a pressure detection sensor 374. The temperature detection sensor 37 can be arranged on the bottom, the internal wall of the housing, or the partition walls of the cooking device. The image detection sensor 372 and the pressure detection sensor 374 are arranged on the lid of the cooking device. The exhaust module 38 and the cooling module 39 are respectively connected with the processor 362 of the control module 36. The nozzle of air supply of the exhaust module 38 can be arranged on the lid. The cooling module 39 can be arranged on the base, the internal wall of the housing, the partition wall or the lid of the cooking device, and it is preferable that the cooling module 39 is arranged on the lid. Since the cooking device is provided with the image detection sensor 372 and the exhaust module 38, the image or video of a cooking process can be recorded at the time of cooking food, which can make the record of the cooking process more clear. Furthermore, since the exhaust module 38 can exhaust the gas generated when cooking food, the image detection sensor 372 can take pictures or videos more distinct. For example, before starting the image detection sensor 372, the steam in the inner pots can be exhausted through the exhaust module 38, and the gas in the inner pots can be further extracted through the air-extraction element until the gas pressure is slightly lower than the air pressure, which can guarantee that the image detection sensor 372 can take clear pictures or videos, and also can avoid the image detection sensor 372 to be polluted by the steam generated by cooking food. By arranging the wireless unit 366 as an input/output device, the cooking device can record cooking parameters of the cooking process by the detection module 370, and the cooking parameters can be transmitted through the processor 362 and the wireless unit 366. Further, the control commands from the portable electronic device can be received by the wireless unit 366, which can achieve smarter automatic cooking function of the cooking device. The cooling module 39 is arranged to enable the cooking device to cook food with more flavors; for example, in some dishes that need sudden cooling, the cooling module can be used to achieve sudden cooling of the inner pots, and thus more delicious food can be cooked.

This disclosure also provides a cooking method: first, putting the food to be cooked into the inner pots of a cooking device according to any one of the exemplary embodiments of the present invention; next, closing the lid and starting the cooking device; at the time of cooking, setting up the control module to enable the outside air to enter the inner pots and contact with the food being cooked; before opening the lid, manipulating the control module so that the fog or the oil fume in the inner pots is exhausted through the exhaust module and outside air enters into the inner pots; and after opening the lid, setting the air-extraction element of the exhaust module to continue running to extract the fog or the oil fume evaporated from the food continuously. With the cooking method described above, the fog or other oil fumes generated during cooking food can be exhausted, and thus it is possible to prevent the influence of oil fumes on human health and pollution from the kitchen.

What is claimed is:

1. A cooking device, comprising:
   a base;
   a housing, disposed on the base and provided with a storage compartment;
   partition walls, detachably fixed through the base and an inner wall of the housing to divide the storage compartment into a plurality of sub-storage compartments, wherein the plurality of sub-storage compartments are configured to accommodate a plurality of inner pots therein respectively;
   a lid, disposed on the housing and matched with an opening of the storage compartment;
   a control module, comprising a processor and an input panel connected with the processor;
   an exhaust module, comprising an air-filled passage, an air-extraction element, an inlet passage and an exhaust passage, wherein the inlet passage is disposed on the lid, the air-filled passage is disposed on the inlet passage, the air-extraction element is disposed on the exhaust passage and used to exhaust fog or oil fume generated in the plurality of inner pots;
   a connecting electrode, arranged in a middle position of the base; and
   a heating module, comprising:
      bottom heating units, disposed different locations inside the storage compartment respectively and connected with the processor individually and further controlled independent from each other;
      second heating units, arranged on the partition walls and connected with the connecting electrode by wires inside the partition walls; and
      third heating units, arranged on the inner wall of the housing.

2. The cooking device according to claim 1, wherein the amount of the plurality of sub-storage compartments is three, and the amount of the bottom heating units is three; the three bottom heating units are respectively arranged corresponding to the three sub-storage compartments.

3. The cooking device according to claim 1, wherein the amount of the plurality of sub-storage compartments is two, and the amount of the bottom heating units is three; two of the three bottom heating units are arranged corresponding to one of the two sub-storage compartments, and the other one of the three bottom heating units is arranged corresponding to the other one of the two sub-storage compartments.

4. The cooking device according to claim 1, wherein the air-filled passage is provided with a gas storage chamber used to jet gas to the at least one inner pot.

5. The cooking device according to claim 1, wherein the inlet passage is provided with a rotatable nozzle, and the rotatable nozzle is arranged on an inner surface of the lid.

6. The cooking device according to claim 1, wherein the air-extraction element is provided with a vacuum chamber used to exhaust air.

7. The cooking device according to claim 1, wherein the cooking device further comprises a detection module connected to the processor; the detection module comprises temperature detection sensors arranged on the partition walls and the inner wall of the housing, the temperature detection sensors are connected to the processor and configured to detect temperature information of the plurality of inner pots during a cooking process and transmit the temperature information to the processor as a cooking parameter.

8. The cooking device according to claim 6, wherein the detection module further comprises a pressure detection sensor disposed on the lid.

* * * * *